(12) United States Patent
Aoyama

(10) Patent No.: US 9,979,266 B2
(45) Date of Patent: May 22, 2018

(54) ELECTRICAL ROTATING MACHINES

(71) Applicant: SUZUKI MOTOR CORPORATION, Shizuoka (JP)

(72) Inventor: Masahiro Aoyama, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 270 days.

(21) Appl. No.: 14/851,233

(22) Filed: Sep. 11, 2015

(65) Prior Publication Data

US 2016/0079835 A1    Mar. 17, 2016

(30) Foreign Application Priority Data

Sep. 16, 2014   (JP) .................................. 2014-187920

(51) Int. Cl.
| | | |
|---|---|---|
| *H02K 16/02* | (2006.01) | |
| *H02K 1/24* | (2006.01) | |
| *H02K 49/10* | (2006.01) | |
| *H02P 25/18* | (2006.01) | |

(52) U.S. Cl.
CPC ............. *H02K 16/02* (2013.01); *H02K 1/24* (2013.01); *H02K 49/10* (2013.01); *H02K 2213/06* (2013.01); *H02K 2213/12* (2013.01); *H02P 25/18* (2013.01)

(58) Field of Classification Search
CPC ..... H02K 16/00; H02K 16/02; H02K 11/0073
USPC .................. 310/112, 113, 114, 266
See application file for complete search history.

(56) References Cited

U.S. PATENT DOCUMENTS

| | | | | |
|---|---|---|---|---|
| 5,917,248 A | * | 6/1999 | Seguchi .................. | B60K 6/26 290/31 |
| 2003/0201686 A1 | * | 10/2003 | Narita .................... | H02K 16/04 310/211 |
| 2005/0077800 A1 | * | 4/2005 | Hoeijmakers ............ | B60K 6/26 310/266 |
| 2010/0219706 A1 | * | 9/2010 | Watanabe ................ | B60K 6/22 310/107 |
| 2011/0163623 A1 | | 7/2011 | Rens et al. | |

(Continued)

FOREIGN PATENT DOCUMENTS

| | | |
|---|---|---|
| CN | 2720713 Y | 8/2005 |
| CN | 101741192 A | 6/2010 |
| CN | 101874337 A | 10/2010 |

(Continued)

*Primary Examiner* — Hanh Nguyen
(74) *Attorney, Agent, or Firm* — Rothwell, Figg, Ernst & Manbeck, P.C.

(57) ABSTRACT

An electrical rotating machine comprises a stator including armature pole coils 14 capable of generating magnetic flux when energized, an inner rotor driven to rotate when the magnetic flux passes therethough, and an outer rotor driven to rotate in a magnetic path of the magnetic flux that passes through the first rotor, the outer rotor having portions of different materials, in permeability, which are situated along the periphery of the outer rotor, the inner rotor having a plurality of salient poles situated along the periphery of the inner rotor and wound by wound coils 34 which induce induced current when linked by the magnetic flux generated by the armature pole coils, the stator including a plurality of wound coils 51, 52, 53 winding around each of poles to constitute the armature pole coil for each of the plurality of salient poles.

3 Claims, 13 Drawing Sheets

(56) References Cited

U.S. PATENT DOCUMENTS

| | | | |
|---|---|---|---|
| 2013/0093275 A1* | 4/2013 | Kim | H02K 16/04 310/114 |
| 2013/0234553 A1* | 9/2013 | Kusase | H02K 16/02 310/114 |

FOREIGN PATENT DOCUMENTS

| | | |
|---|---|---|
| JP | 2009-142120 A | 6/2009 |
| JP | 2013-111734 A | 6/2013 |
| JP | 2013-150500 A | 8/2013 |
| JP | 2013-208015 A | 10/2013 |
| JP | 2014-166023 A | 9/2014 |
| WO | 2014/128985 A1 | 8/2014 |

* cited by examiner

ELECTRICAL ROTATING MACHINES

CROSS-REFERENCE

This document claims priority to Japanese Application Number 2014-187920, filed Sep. 16, 2014, the entire content of which is hereby incorporated by reference.

TECHNICAL FIELD

The present invention relates to electrical rotating machines of the double-rotor type.

BACKGROUND ART

Electrical rotating machines are installed, as power sources, in various apparatuses, and their applications to vehicles include, for example, a power source of an electric vehicle when installed alone in the vehicle or a power source of a hybrid electric vehicle to operate in association with an internal combustion engine. Hybrid electric vehicles are specifically expected to increase mechanical efficiency of power transmission, so there is a need for a torque high enough to enhance acceleration performance and performance to clear differences in level.

In particular, sometimes, the hybrids, utilizing, for example, a power transmission path which sequences an internal combustion engine, an electrical rotating machine and traction wheels in series (or a serial sequence type), allow the traction wheels to spin entirely on the electrical rotating machine and extend range of the vehicle by recharging a power source battery for the electrical rotating machine after converting power of the internal combustion engine into electrical energy, a so-called "range extender" system.

Energy flow through such power transmission path which requires conversion from mechanical energy to electrical energy results in massive conversion losses and prolonging the power transmission path (or prolonged energy path) results in a drop in energy transmission efficiency. Range extender system, for example, allows its electrical rotating machine to operate by controlling supply of electrical energy to and/or discharge of electrical energy from its power source battery because the electrical rotating machine is situated between the rotation of traction wheels and the rotation of an internal combustion engine. Thus, in the range extender system, the prolonged energy path in addition to energy conversion loss brought about by requiring energy conversion between mechanical energy and electrical energy becomes one of causes for a drop in energy transmission efficiency.

Meanwhile, JP2013-208015A (Patent Literature 1), for example, describes an electrical rotating machine with double rotors inside a stator and makes it known to couple rotating shafts for the rotors to the side of traction wheels and the side of an internal combustion engine, respectively.

Incidentally, with respect to an electrical rotating machine including armature pole coils, the speed vs. torque output characteristic is determined by induced voltage that depends on number of turns of each of the armature pole coils and thus setting is made in advance such that the electrical rotating machine works in high efficient operation area, so that a gearbox has been required to allow the vehicle to drive outside such high efficient operation area.

PRIOR ART

Patent Literature

Patent Literature 1: JP2013-208015A

SUMMARY OF INVENTION

Technical Problem

Therefore, an object of the present invention is to provide an electrical rotating machine of the double-rotor type adjustable to any desired output characteristic with a limited efficiency drop in energy transmission.

Solution to Problem

According to one aspect of the present invention, there is provided an electrical rotating machine comprising: a stator including armature pole coils capable of generating magnetic flux when energized; a first rotor driven to rotate when the magnetic flux passes therethough; and a second rotor driven to rotate in an electromagnetic path of the magnetic flux that passes through the first rotor, wherein the second rotor includes portions of different materials, in permeability, which are situated along the periphery of the second rotor, the first rotor includes a plurality of salient poles situated along the periphery of the first rotor and wound by induction coils which induce induced current when linked by the magnetic flux generated by the armature pole coils, and the stator includes a plurality of wound coils winding around each of poles to constitute the armature pole coil for each of the plurality of salient poles, the plurality of wound coils to be energized being changeable.

Advantageous Effects of Invention

According to the one aspect of the present invention, in the electrical rotating machine of the double-rotor type, among wound coils constituting armature pole coils, induced voltage may be generated in response to the number of and the type of wiring for some of them to be energized so that an electrical rotating machine is provided which is adjustable to any desired output characteristic with a limited efficiency drop in energy transmission.

DESCRIPTION OF EMBODIMENTS

Referring to the accompanying drawings, embodiments of the present invention are described in detail below. FIGS. 1 to 12 show an electrical rotating machine according to one embodiment of the present invention.

Figure 1:
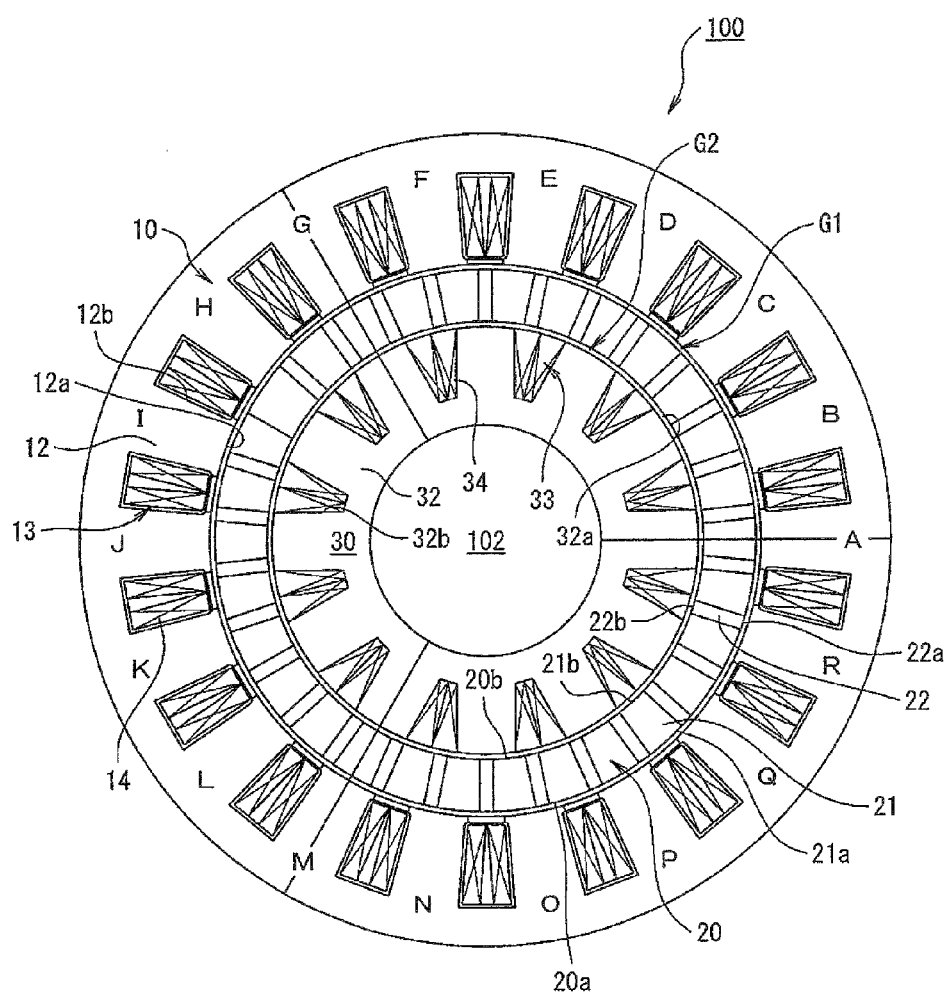
FIG. 1 is a cross section perpendicular to an axis of rotation, i.e. a view showing an electrical rotating machine according to one embodiment of the present invention, showing its schematic overall configuration.
Figure 2:
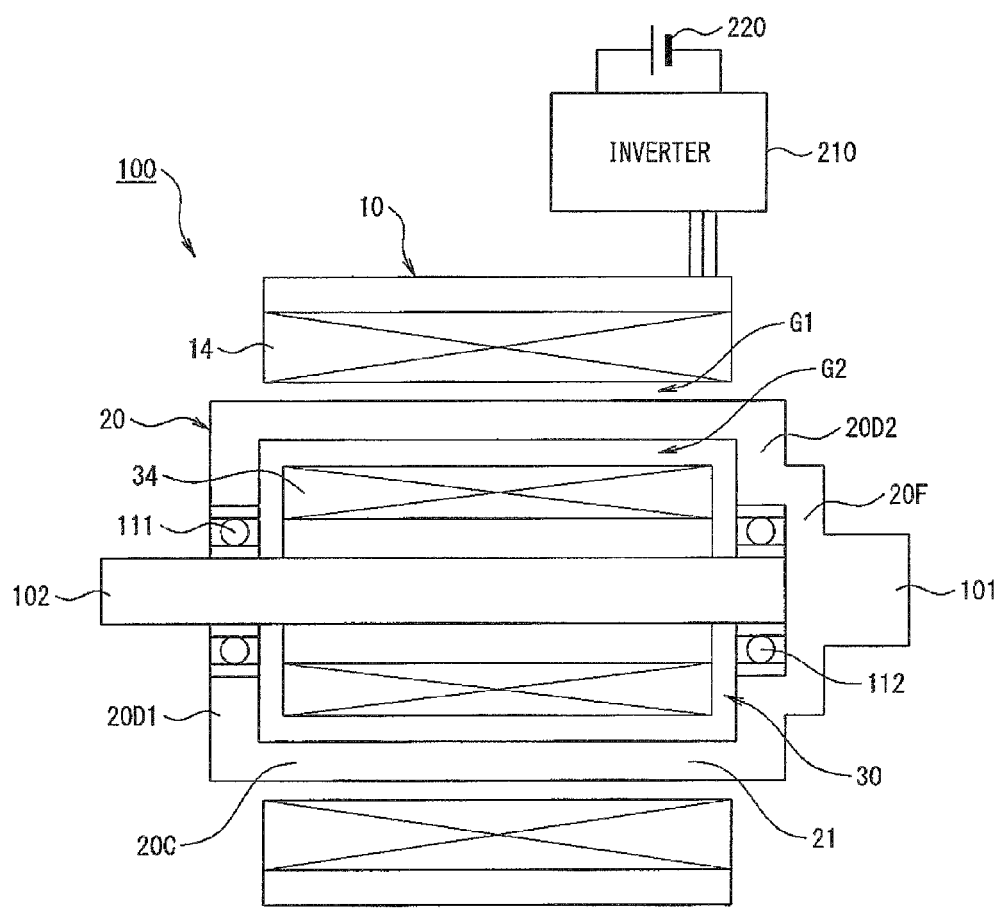
FIG. 2 is a cross section through the axis of rotation showing the schematic overall configuration of the electrical rotating machine.

In FIGS. 1 and 2, a double-rotor type motor or electrical rotating machine 100 includes a stator 10 formed in an approximately cylinder shape, a second rotor or an outer rotor 20 rotatably disposed in stator 10 and fixed to a rotating input shaft (also called simply "a rotating shaft") 101 coaxial with the center of shaft, and a first rotor or an inner rotor 30 fixed to a rotating output shaft (also called simply "a rotating shaft") 102 coaxial with the center of shaft.

Stator 10 is formed with a plurality of stator teeth 12 extending radially inwardly from radially outside peripheral portion of stator 10 toward radially inside peripheral portion thereof in a way that inner peripheral surfaces 12a face an outer peripheral surface 20a of outer rotor 20 via an air gap G1. Armature pole coils 14 are provided by winding, with concentrated winding, wound coils using slots 13 each between mutually opposed sides 12b of the adjacent two stator teeth 12, and outer and inner rotors 20, 30 are driven to rotate by supplying power to these armature pole coils 14 to allow magnetic flux to develop and link outer and inner rotors 20, 30.

Outer rotor 20 includes a plurality of relay members or portions 21 of magnetic material with high permeability such as steel, and a plurality of restriction members or portions 22 of non-magnetic material with low or no permeability such as resin impervious to magnetic flux, which are situated along the periphery of outer rotor 20 in a way that each of the plurality of relay portions 21 is between the adjacent two of the plurality of restriction portions 22. An end face 21a of each of the plurality of relay portions 21 is exposed at a site within an outer peripheral surface 20a of outer rotor 20 between two sites where end faces 22a of the adjacent two of the plurality of restriction portions 22 are exposed, while an end face 21b of each of the plurality of relay portions 21 is exposed at a site within an inner peripheral surface 20b of outer rotor 20 between two sites where end faces 22b of the adjacent two of the plurality of restriction portions 22 are exposed.

Owing to this arrangement, outer rotor 20 permits magnetic flux, which develops within some of armature pole coils 14 and links a portion of outer peripheral surface 20a of outer rotor 20, to efficiently pass between the both end faces 21a, 21b at one or more of relay portions 21 situated adjacent the portion of outer peripheral surface 20a, but it prevents the passage of the magnetic flux at restriction portions 22. After the passage through the one or more of relay portions 21 of outer rotor 20, the magnetic flux, which develops within some of armature pole coils 14, links one or more of outer peripheral surfaces 32a of rotor teeth 32 of inner rotor 30, which will be described later, and again passes through another one or more of the relay portions 21 of outer rotor 20, and returns to stator 10, forming a magnetic circuit.

During this time, since outer rotor 20 rotates relative to stator 10, switching between relay portion 21, which allows the passage of magnetic flux, and restriction portion 22, which restricts the passage of magnetic flux, is repeated in a magnetic circuit formed. This enables outer rotor 20 to cause the change in the amount of magnetic flux, which develops in armature pole coils 14, linking outer rotor 20. For this reason, this outer rotor 20 can rotate relative to stator 10 owing to a reluctance torque or a torque that minimizes the path of magnetic flux through air gap G1 between stator 10 and outer rotor 20.

Inner rotor 30 is formed with salient poles or a plurality of rotor teeth 32 situated along the periphery of inner rotor 30 and extending radially outwardly from rotating shaft side in a way that outer peripheral surfaces 32a face inner peripheral surface 20b of outer rotor 20 via an air gap G2. Rotor teeth 32 are wrapped by induction coils or wound coils 34 using slots 33 each between mutually opposed sides 32b of the adjacent two rotor teeth 32. These wound coils 34, each winding around one of rotor teeth 32 in one direction, induce or generate induced current when linked by magnetic flux.

Figure 3:
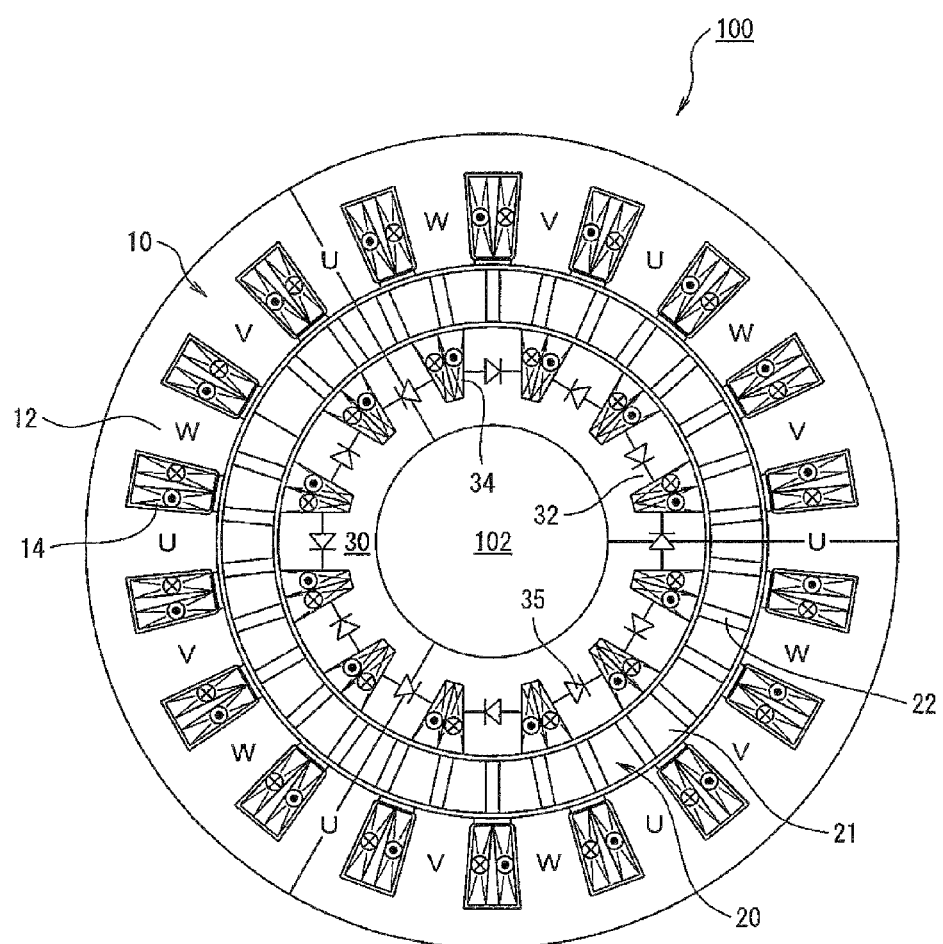
FIG. 3 is view of schematic connections showing connection directions of diodes placed in its inner rotor.

As shown in FIG. 3, inner rotor 30 has diodes 35, each coupled to conductor ends of one of wound coils 34 wrapping rotor teeth 32, respectively, to form a closed loop, and each of diodes 35 rectifies induced current generated at the associated one of wound coils 34 by allowing current to flow through the wound coil 34 to provide short-circuit connection and by cutting off flow of current in the opposite direction. These diodes 35 are connected to wound coils 34 which wrap rotor teeth 32 in the same direction, and alternately reversed in direction of rectification so that the adjacent two diodes have one and the opposite directions of rectification, respectively.

This arrangement allows inner rotor 30 to generate electromagnetic force by self-energization of wound coil 34 owing to DC field current obtained by rectifying induced current flowing through the wound coil 34 with diode 35.

During this time, that one of rotor teeth 32 of inner rotor 30 which forms a portion of a magnetic circuit serves as an electromagnet magnetized to induce the linking magnetic flux away from relay portion 21 of outer rotor 20. In electrical rotating machine 100 according to the present embodiment, the rotor tooth 32 serves as such electromagnet by causing diode 35 to rectify the induced current generated at wound coil 34.

Moreover, the adjacent rotor tooth 32 serves as an electromagnet magnetized to induce the linking magnetic flux toward outer rotor 20. In electrical rotating machine 100 according to the present embodiment, the rotor tooth 32 serves as such electromagnet by causing diode 35, whose direction of rectification is the opposite to the direction of rectification of induced current at the adjacent rotor tooth 32, to rectify the induced current generated at wound coil 34.

In other words, inner rotor 30 can cause the change in the amount of magnetic flux linking rotor teeth 32 from outer peripheral surfaces 32a by rotating relay portions 21 and restriction portions 22 relative to stator 10. This causes each of wound coils 34 to generate induced current. Moreover, the induced current is rectified by diode 35 to provide DC field current to energize wound coil 34, causing wound coil 34 to work as an electromagnet to generate electromagnet force.

During this time, the magnetic flux, linking one of rotor teeth 32 of inner rotor 30 through one of relay portions 21 of outer rotor 20 from one of stator teeth 12 of stator 10, is generated by supplying power from AC power source to one of armature coils 14 formed by concentrated winding. For this reason, more space harmonic components are superimposed on the magnetic flux linking the rotor tooth 32 than those superimposed on magnetic flux generated by a coil formed by distributed winding. Thus, since space harmonic components superimposed on the magnetic flux work to cause a change in the amount of magnetic flux, it is possible to effectively generate induced current at wound coil 34 and generate a large electromagnetic force.

Figure 4:
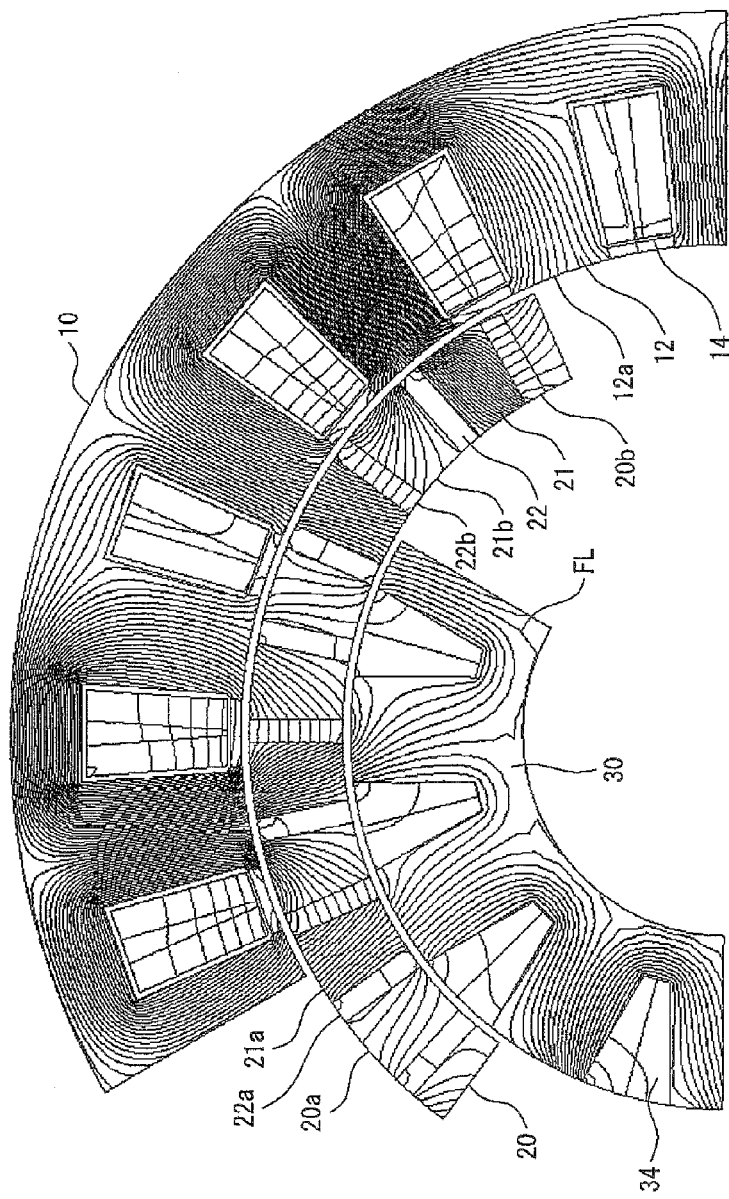
FIG. 4 is a magnetic flux diagram showing formation of magnetic flux delivered among a stator, an outer rotor and an inner rotor.

Therefore, electrical rotating machine 100 can cause outer rotor 20 to rotate owing to reluctance torque by causing magnetic flux, which is generated by supplying power to armature pole coil 14 of stator 10 and is shown in FIG. 4 as an FL, to link relay portion 21 of outer rotor 20. Moreover, electrical rotating machine 100 can cause wound coil 34 to generate induced current by causing magnetic flux, which is subject to change in amount after experiencing the passage through relay portion 21 of rotating outer rotor 20, to link wound coil 34 of inner rotor 30. This causes generation of electromagnetic force by rectifying the induced current with diode 35 to act, as DC field current, on wound coil 34. This allows electrical rotating machine 100 to cause its inner rotor 30 to carry out relative rotation owing to torque or magnetic torque, without providing permanent magnets. This inner rotor 30 allows magnetic flux to pass from and to outer rotor 20 by smoothly bypassing slot 33 by causing diodes 35 to make rotor teeth 32 to work as permanent magnets which are situated along the periphery of inner rotor with the adjacent two reversed in direction of magnetization.

Figure 5:
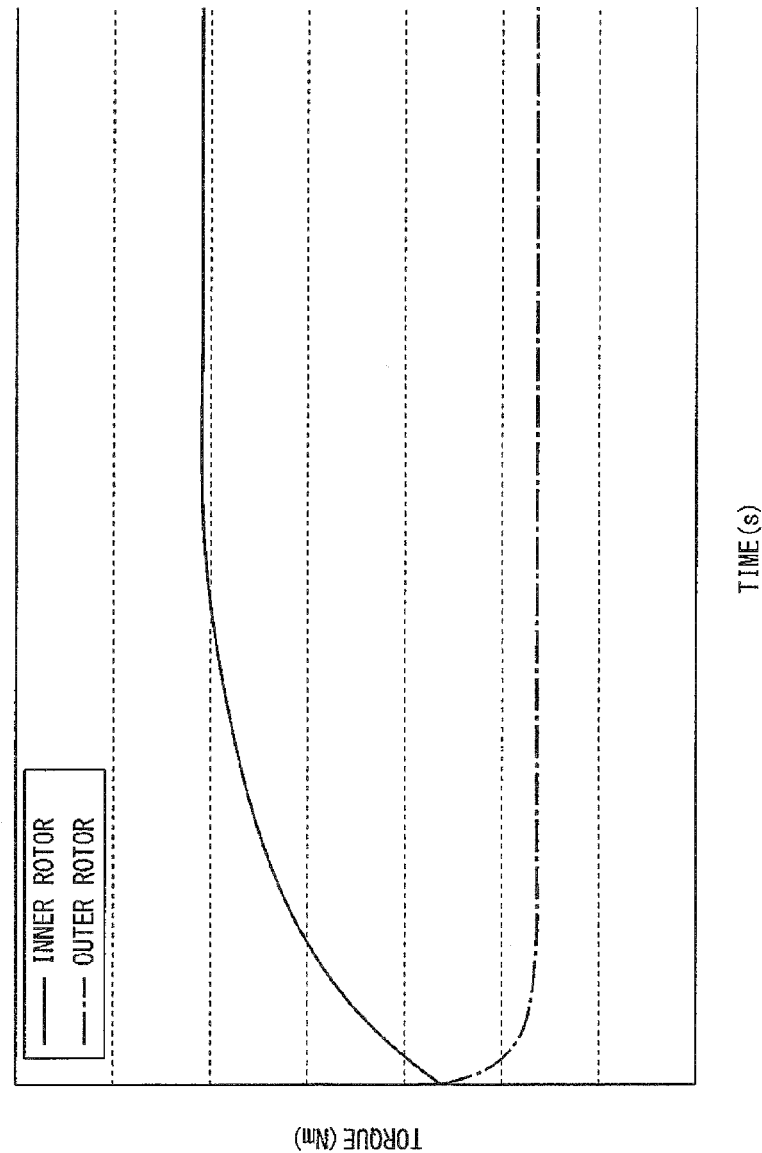
FIG. 5 is a graph of torque on the outer rotor and torque on the inner torque in the magnetic flux delivered among the stator, outer rotor and inner rotor.

This electrical rotating machine 100 allows high speed rotation of inner rotor 30 as well as low speed rotation of outer rotor 20 as shown in FIG. 5 because outer rotor 20 is rotated relative to stator 10 by reluctance torque, and inner rotor 30, which magnetic flux passes through outer rotor 20 or relay portion 21 to link, is rotated relative to stator 10 by magnetic torque.

Moreover, this electrical rotating machine 100 is configured to provide varying torques required for the above-mentioned rotations with different combinations, in construction, of stator 10, outer rotor 20 and inner rotor 30. With regard to the details of such combinations, examples are such combinations of the number Ns of slots 13 of stator 10, the number Nor of relay portions 21, i.e., the number of poles of outer rotor 20, and the number Nir of rotor teeth 32, i.e., the number of poles of inner rotor 30 as to satisfy the following equation (1). This construction makes it possible to efficiently rotate outer rotor 20 and inner rotor 30 relative to stator 10 by effectively generating the above-mentioned reluctance torque and magnet torque. For example, in electrical rotating machine 100 according to the present embodiment, the slot number of stator 10 Ns=18, the pole number of outer rotor 20 Nor=30, and the pole number of inner rotor 30 Nir=12, and satisfy the following equation (1).

$$Nor = Ns \pm Nir \qquad (1).$$

Figure 6:
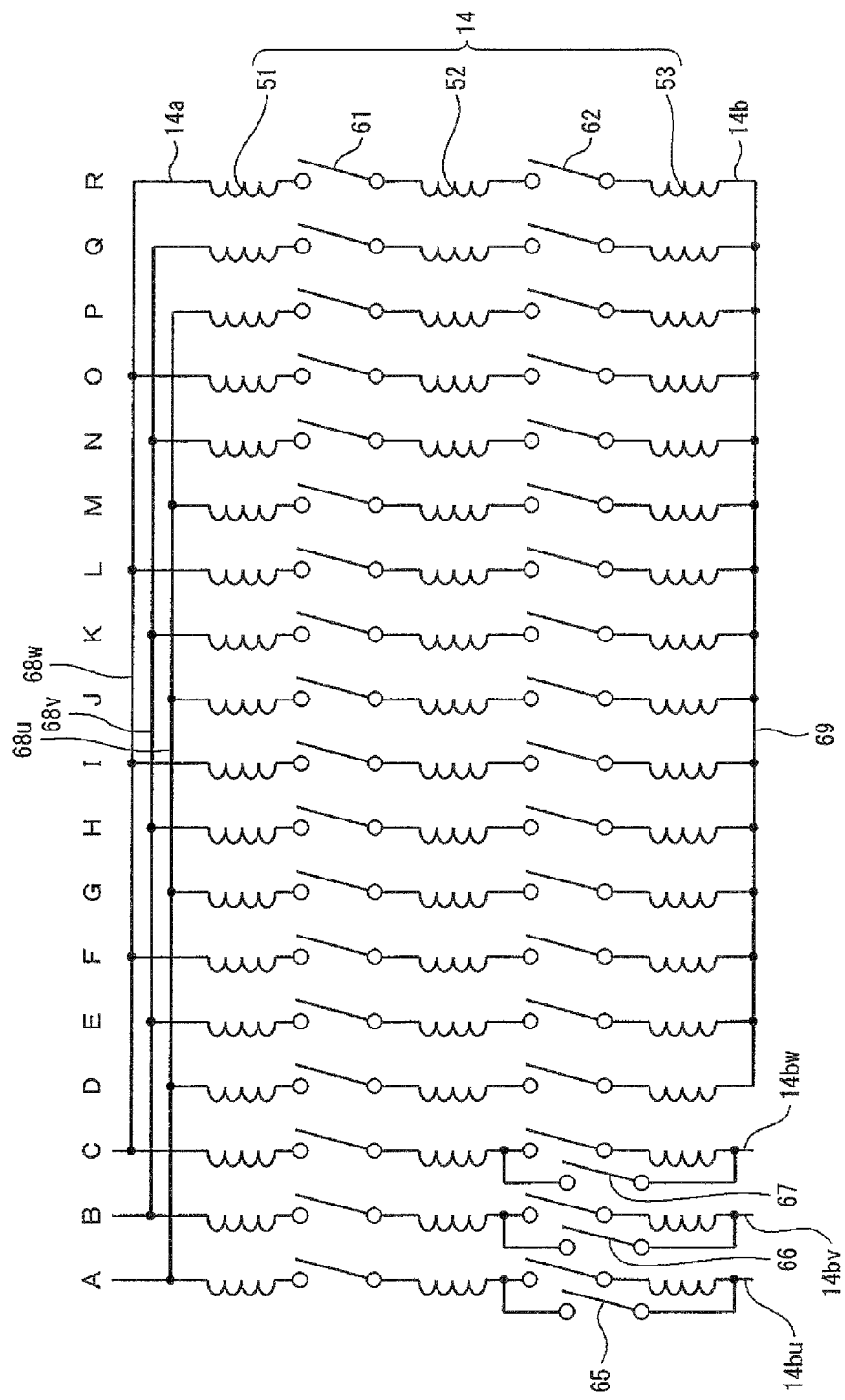
FIG. 6 is an electrical circuit diagram of a system for changing connections of wound coils which constitute each of armature pole coils.

Moreover, as shown in FIG. 6, stator 10 has, in each of stator teeth 12, an armature pole coil 14 including a set of three wound coils 51, 52, and 53 arranged to be connectable in series. In this armature pole coil 14, wound coils 51, 52 are connected or disconnected by a connection switch 61, and wound coils 52, 53 are connected or disconnected by a connection switch 62.

Three armature pole coils 14 are coupled in parallel at 6 points using leads 68u, 68v, 68w, and generate magnetic flux when three-phase AC power from a power source is supplied as a drive current. Describing FIG. 6 with provisional labeling of each of poles or stator teeth 12 shown in FIG. 1, let three magnetic poles, selected from 18 magnetic poles from A magnetic pole to R magnetic pole, be one set, one ends 14a of leads in each of three phases consisting of U-phase, V-phase, and W-phase are connected in common. Further, the other ends 14b of leads are connected by a lead 69 to couple D to R poles in common to form a neutral point connection. Furthermore, the other ends of leads for A to C poles are formed into input terminals 14bu, 14bv, and 14bw.

These armature pole coils 14, in which bypass switches 65, 66, and 67 are provided to bypass wound coils 53 in three poles from A pole to C pole, respectively, comprises a detachable connection ring 70 (see FIG. 8) interconnecting connection switch 62 sides of wound coils 51 in 15 poles ranging from D pole to R pole in common to form a neutral point connection. This allows armature pole coils 14 to form a circuit configuration making a shortcut route not through wound coils 53 in all poles ranging from A pole to R pole by turning ON bypass switches 65, 66, and 67 and installing connection ring 70.

Figure 9:
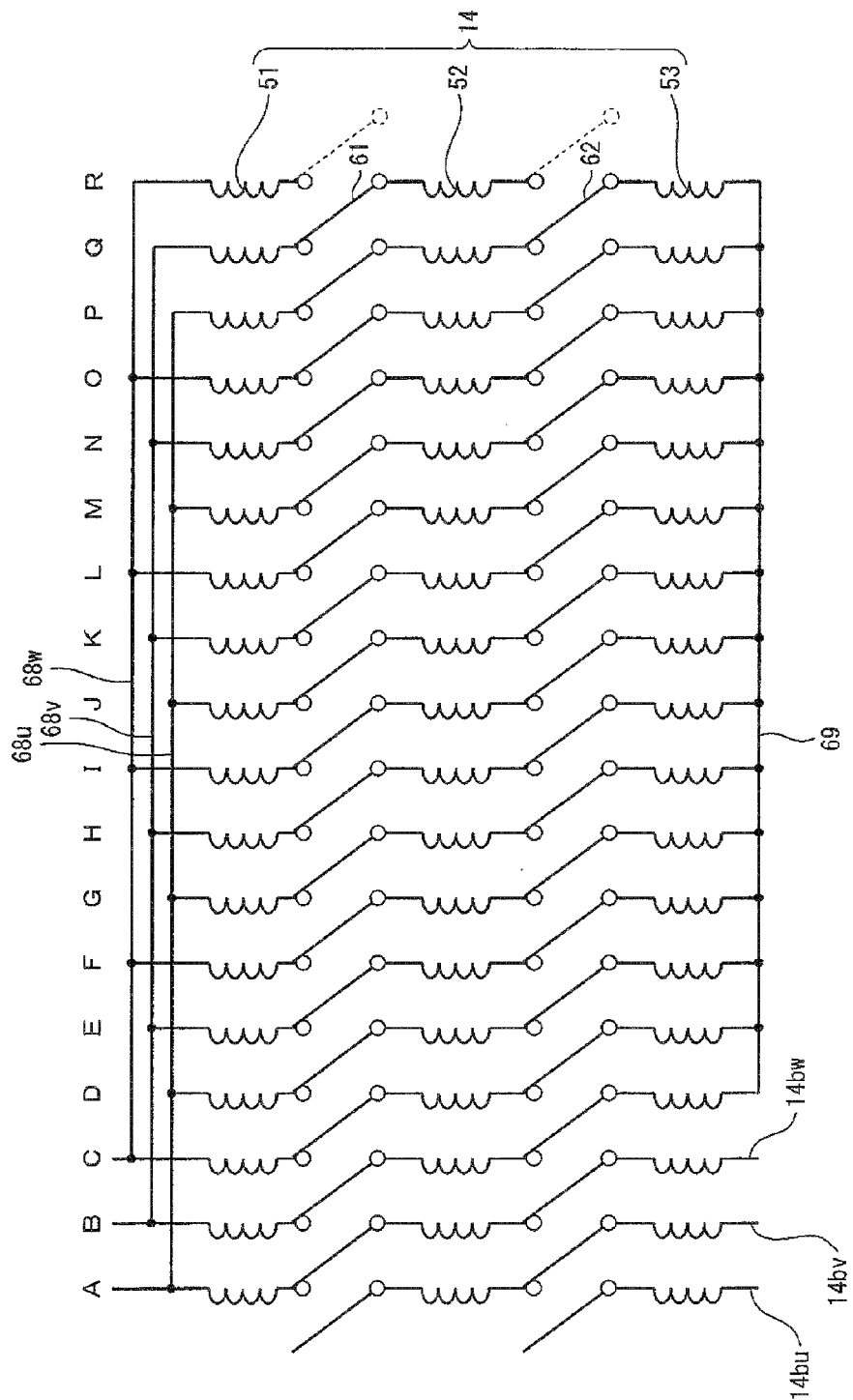
FIG. 9 is an electrical circuit diagram of another example, different from FIG. 7 or 8, of connections of the wound coils which constitute each of armature pole coils.

Moreover, in armature pole coils 14, connection switches 61, 62 can be used not only to interconnect wound coils 51, 52 in one pole and to interconnect wound coils 52, 53 in the one pole, but also to connect wound coil 52 in one pole to wound coil 51 in one of the adjacent poles and to connect wound coil 52 in the one adjacent pole to wound coil 53 in the other of the adjacent poles (see FIG. 9).

In other words, armature pole coils 14 are configured to change the number of wound coils 51, 52, 53 to be energized and circuit. Specifically, connection switches 61, 62, bypass switches 65, 66, 67, and connection ring 70 constitute a changing mechanism for changing the number of wound coils 51, 52, 53 to be energized and circuit.

Figure 7:
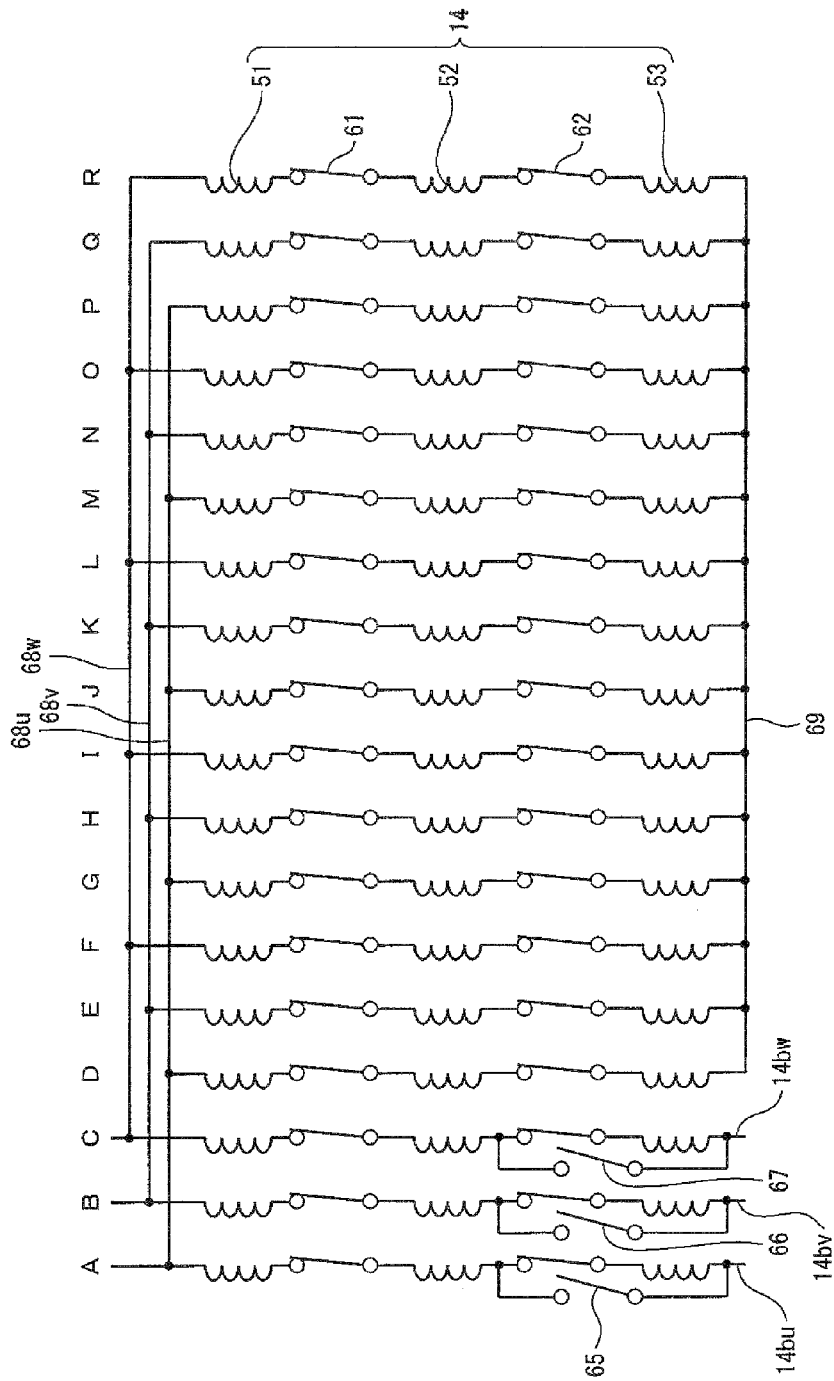
FIG. 7 is the electrical circuit diagram of one example of connections of the wound coils which constitute each of armature pole coils.

This allows armature pole coils 14 to form a circuit configuration shown in FIG. 7 by opening bypass switches 65, 66, 67 and by connecting wound coils 51, 52 together by connection switch 61 and energizing them and by connecting wound coils 52, 53 together by connection switch 62 and energizing them per stator tooth 12. This circuit configuration allows electrical rotating machine 100 to supply drive current to energize armature pole coils 14 coupled at 6 points in parallel by carrying out concentrated winding after connecting three wound coils 51, 52, 53 in series per stator tooth 12.

Figure 8:
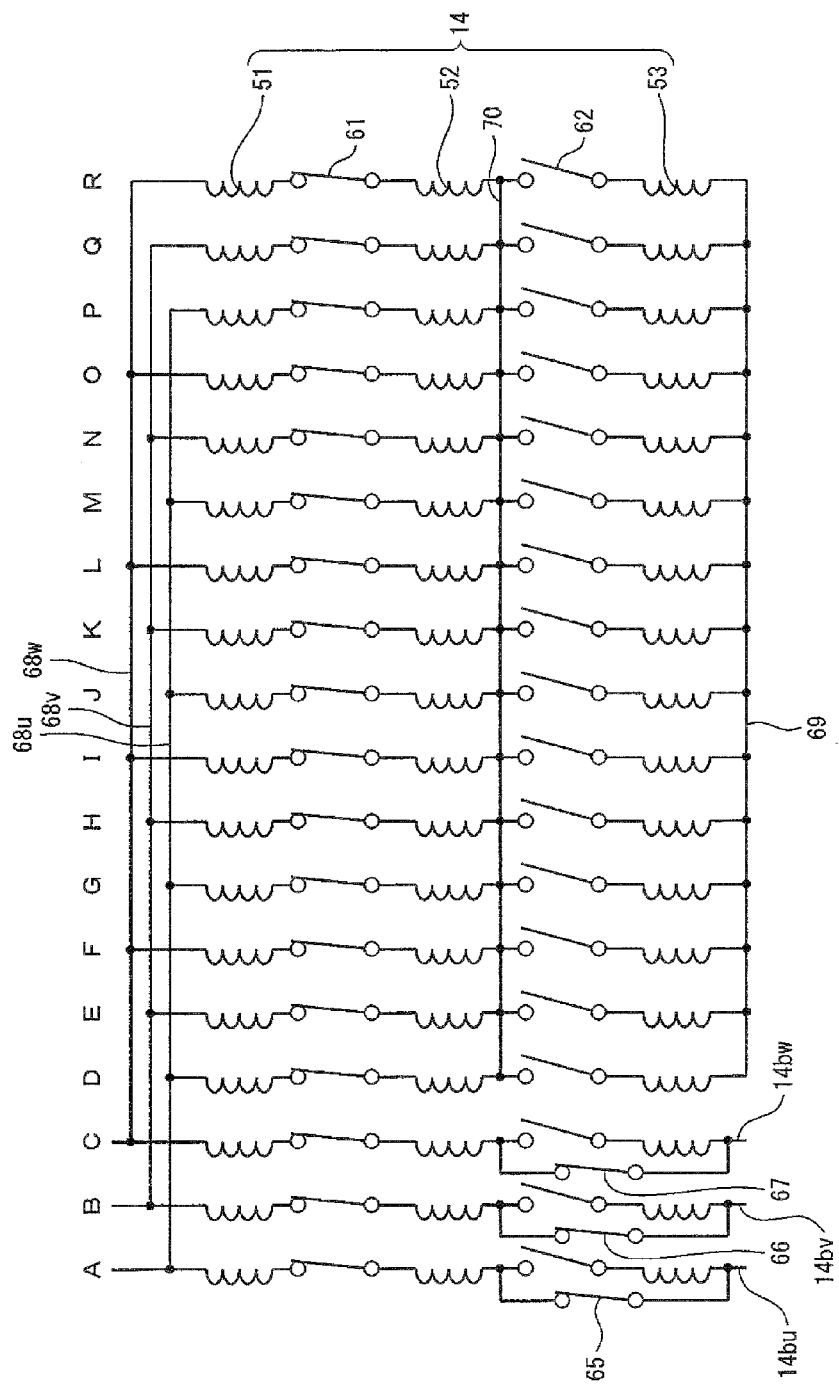
FIG. 8 is an electrical circuit diagram of another example, different from FIG. 7, of connections of the wound coils which constitute each of armature pole coils.

Moreover, armature pole coils 14 may form a circuit configuration shown in FIG. 8 by closing bypass switches 65, 66, 67 to form a circuit bypassing wound coils 53 in poles from A pole to C pole and by cutting off connection switches 62 and installing connection ring 70 to form a circuit excluding wound coils 53 in poles from D pole to R pole, and by, in addition, connecting wound coils 51, 52 together by connection switches 61 per stator tooth 12. This circuit configuration allows electrical rotating machine 100 to supply drive current to energize armature pole coils 14 coupled at 6 points in parallel by carrying out concentrated winding after connecting two wound coils 51, 52 in series per stator tooth 12.

Figure 10:
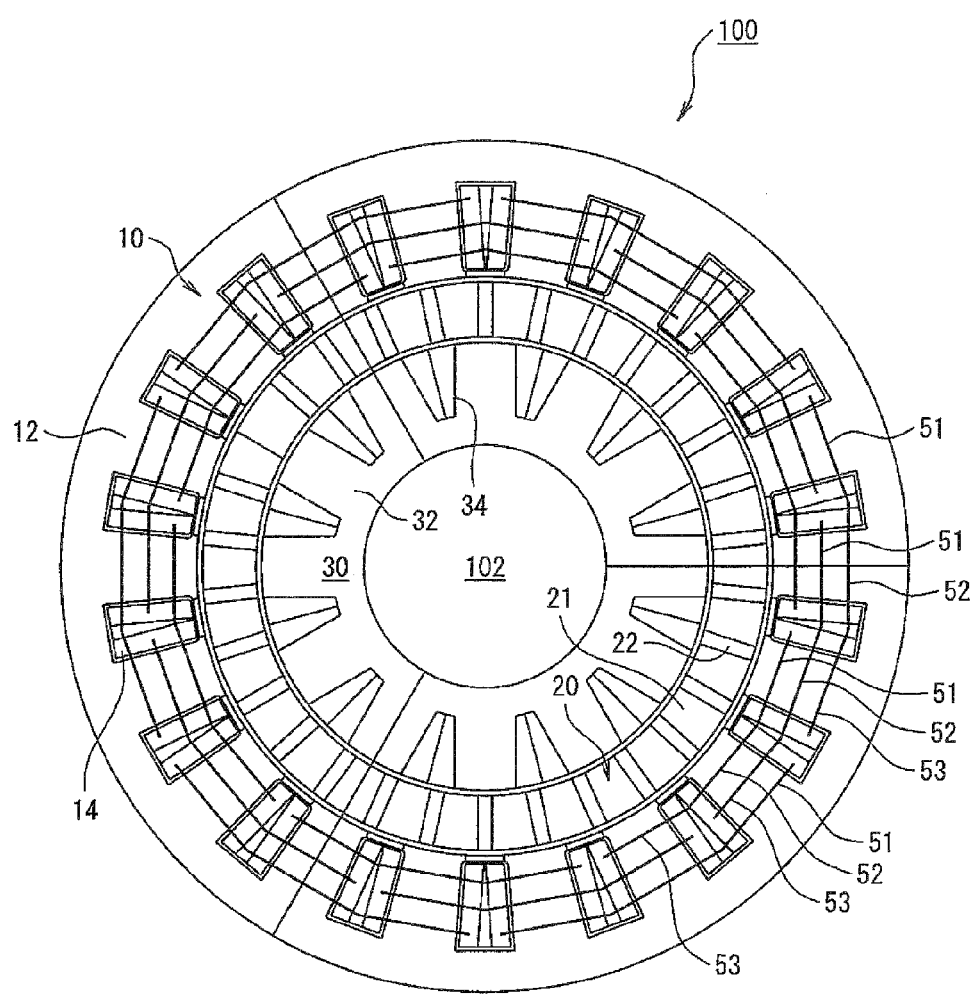
FIG. 10 is a schematic diagram of the relative position of armature pole coils as shown in FIG. 9 on the stator.

Furthermore, armature pole coils 14 may form a circuit configuration shown in FIG. 9 by connecting wound coil 52 in one pole to wound coil 51 in one of the two adjacent poles, connecting wound coil 52 in the one adjacent pole to wound coil 53 in the other of the two adjacent poles, and energizing them. As shown in FIG. 10, this circuit configuration allows electrical rotating machine 100 to supply drive current to energize armature pole coils 14 coupled at 6 points in parallel by carrying out distributed winding after connecting three wound coils 51, 52, 53 in series in three adjacent stator teeth 12.

In FIG. 9, connection switches 61, 62 for connecting wound coils 51, 52, 53 for A pole and those for connecting wound coils 51, 52, 53 for R pole are illustrated at two sites, but the connection switches 61, 62 are disposed in stator tooth 12 for A pole, and connection switches 61, 62 connected to wound coils 51, 52 for R pole are shown by broken lines. FIG. 10 is a view showing that armature pole coils 14 are configured in distributed winding by connecting wound coils 51, 52, 53 provided in the adjacent stator teeth 12, and it is not intended to limit the radial position where wound coils 51, 52, 53 are wound around each of stator teeth 12. Specifically, as shown in FIG. 10, with respect to a radial direction of each of the adjacent two stator teeth 12, wound coils 51, 52, 53 may be connected in series at the same radial position, or with respect to a radial direction of each of the adjacent two stator teeth 12, wound coils 51, 52, 53 may be connected in series in order from a position on outer peripheral side toward a position on inner peripheral side. In addition, with respect to a radial direction of each of the adjacent two stator teeth 12, wound coils 51, 52, 53 may be connected in series in order from a position on inner peripheral side toward a position on outer peripheral side.

Figure 11:
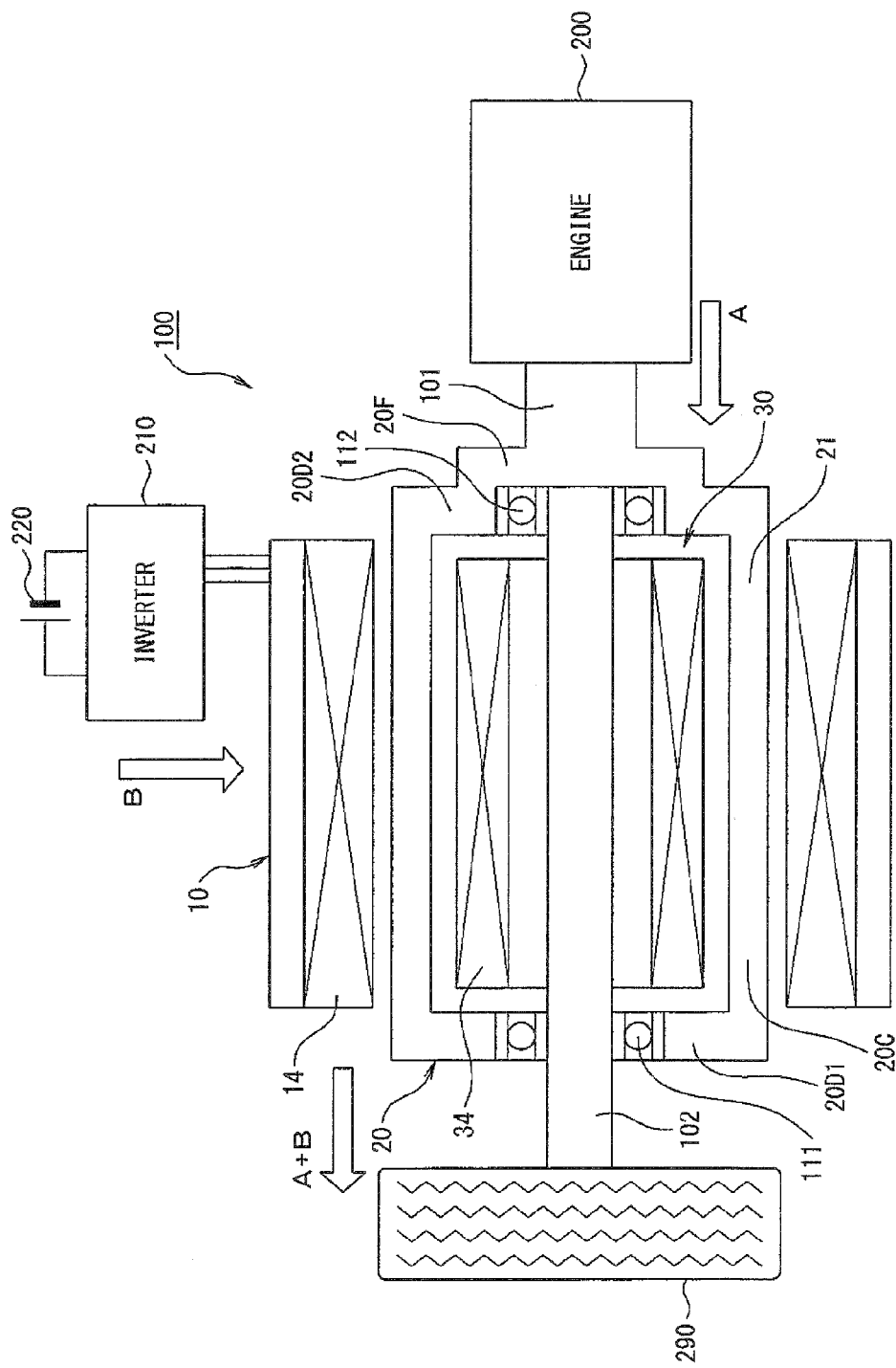
FIG. 11 is a schematic diagram of a practical example of installing the electrical rotating machine in a vehicle.

Moreover, this electrical rotating machine 100, which has performance suitable to be mounted on, for example, a hybrid electric car together with an internal combustion engine or an engine 200 as shown in FIG. 11, in which engine 200 is coupled to a rotating input shaft 101 of outer rotor 20, and a driving wheel 290 is coupled to a rotating output shaft 102 of inner rotor 30, and a battery 220 is connected to armature pole coils 14 of stator 10 via an inverter 210. FIG. 11 is a schematic diagram in which coupling between engine 200 and driving wheel 290 is simplified for description of generation of and delivery of power.

In outer rotor 20, relay portions 21 and restriction portions 22 (not shown in FIG. 11) are arranged in a cylindrical part 20C which is formed into a cylinder shape surrounding inner rotor 30 and faces rotor teeth 32. The cylindrical part 20C is received in stator 10 in a way that relay portions 21 and restriction portions 22 face stator teeth 12. The outer rotor 20 has bearings 111, 112 fixed to center portions of its disc parts 20D1, 20D2 which face axially spaced both end faces of inner rotor 30, respectively, and rotatably supports rotating output shaft 102. Rotating input shaft 101, which extends from an outer portion around the center of the disc part 20D2, is rotatable coaxially with the disc part 20D2.

Inner rotor 30 is fixed to rotating output shaft 102, which is rotatably supported at bearings 111, 112 of outer rotor 20, and is rotatable coaxially with the rotating output shaft 102. Inner rotor 30 allows rotating output shaft 102 to protrude outwardly from a portion supported by bearing 111 of disc portion 20D1 of outer rotor 20.

Moreover, outer rotor 20 has a flange part 20F fixed integrally to disc portion 20D2 and covering bearing 112. Bearing 112 rotatably supports the opposite end side of rotating output shaft 102 of inner rotor 30 protruding outwardly. Outer rotor 20 allows rotating input shaft 101 to protrude outwardly in a coaxial manner with rotating output shaft 102 of inner rotor 30 from the center of flange part 20F.

There is shown in FIG. 11 electrical rotating machine 100 allowing direct connection of engine 200 to rotating input shaft 101 and direct connection of driving wheel 290 to output shaft 102 against the fact that various equipment required for propelling a vehicle, such as a differential, is interposed. It is not intended to leave engine 200 connected to rotating input shaft 101 or leave driving wheel 290 connected to rotating output shaft 102, but power is delivered by any desired path by appropriately establishing direct connection or interrupting such connection.

Thus, electrical rotating machine 100 may allow power energy A fed to rotating input shaft 101 of outer rotor 20 from engine 200 to be directly transmitted to rotate driving wheel 290. In addition, electrical rotating machine 100 may allow electrical energy B supplied from battery 220 to be converted to power energy to turn driving wheel 290 by rotating inner rotor 30 or rotating output shaft 102.

Therefore, electrical rotating machine 100 can limit inconvenience that transmission efficiency drops by energy conversion. In other words, electrical rotating machine 100 rotates driving wheel 290 by transmission of electrical energy B by electrical power from battery 220 and power energy A.

In addition, engine 200 can supply charging power to battery 220 via inverter 210 by rotating outer rotor 20 when driving wheel 290 is disconnected from rotating output shaft 102. Further, electrical rotating machine 100 can start engine 200 as needed by supplying stored power in battery 220 to armature pole coils 14 of stator 10 via inverter 210. In a vehicle having this electrical rotating machine 100, when the vehicle is to be driven on power energy A from engine 200, a power path directly connecting engine 200 to driving wheel 290 should be selected.

Figure 12:
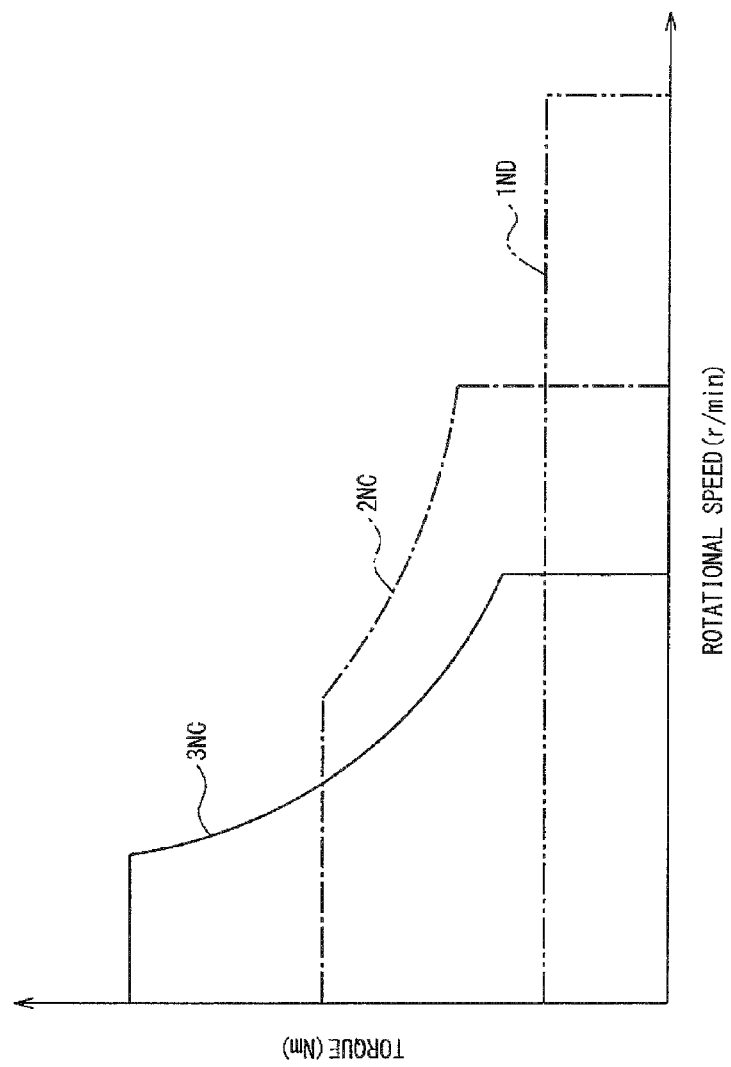
FIG. 12 is a graph of torque vs. speed envelops of the armature pole coils shown in FIG. 7 to FIG. 9.

Supplying power to armature pole coils 14 on stator teeth 12 to energize them cause electrical rotating machine 100 to provide varying torque vs. speed characteristics 3NC, 2NC and 1ND as shown in FIG. 12 with different combinations of the number of coils to be energized on the same stator teeth 12 and type of winding the wound coils upon supply of power of the same phase.

Specifically, torque vs. speed characteristic 3NC of inner rotor 30 upon supply of power to armature pole coils 14 formed by carrying out concentrated winding of three wound coils 51, 52, 53 connected in series, as shown in FIG. 7, indicates that rotating output shaft 102 may be rotated with large torque at low speed. With this torque vs. speed characteristic 3NC, rotation of driving wheel 290 starts smoothly, for example, at the time of starting.

Torque vs. speed characteristic 2NC of inner rotor 30 upon supply of power to ai mature pole coils 14 formed by carrying out concentrated winding of two wound coils 51, 52 connected in series, as shown in FIG. 8, indicates that rotating output shaft 102 may be rotated with middle torque at middle speeds. With this torque vs. speed characteristic 2NC, accelerating driving wheel 290 rotates smoothly, for example, during driving at middle speeds.

Torque vs. speed characteristic 1ND of inner rotor 30 upon supply of power to armature pole coils 14 formed by carrying out distributed winding of three wound coils 51, 52, 53 straddling three adjacent rotor teeth 32 connected in series, as shown in FIGS. 9 and 10, indicates that rotating output shaft 102 may be rotated with low torque at high speeds. With this torque vs. speed characteristic 1ND, cruising driving wheel 290 rotates smoothly, for example, during driving at high speeds.

FIG. 12 shows only distinct torque vs. speed characteristics 3NC, 2NC, and 1ND. Thus, it is suitable to carry out a shift control upon implementation on the vehicle to make a shift among the characteristics smooth and continuous.

In the present embodiment, a plurality of relay portions 21 and a plurality of restriction portions 22 are situated on outer rotor 20 along the periphery of outer rotor 20 in a way that each of relay portions 21 is between the adjacent two of restriction portions 22. Electrical rotating machine 100 includes wound coils 34, each winding around one of rotor teeth 32 in one direction. Diodes 35 are connected to wound coils 34 and alternately reversed in direction of rectification so that the adjacent two diodes have one and the opposite directions of rectification, respectively.

Therefore, electrical rotating machine 100 can cause outer rotor 20 to rotate owing to reluctance torque by causing magnetic flux, which is generated by supplying power to armature pole coil 14 of stator 10, to link relay portion 21 of outer rotor 20. This linking magnetic flux passes through relay portion 21, links wound coil 34 of inner rotor 30, a change in the amount of the linking magnetic flux, and induced current is generated in response this change in the amount of linking magnetic flux. Inner rotor 30 is caused to rotate by magnetic torque generated by rectifying the induced current by diode 35 to act as DC field current.

Moreover, since, in armature pole coil 14 of stator 10, the number of coils to be energized is adjustable and circuit configuration such as concentrated winding or distributed winding is selectable in response to driving condition, it is possible to rotate rotating output shaft 102 at a desired speed and torque by varying induced voltage generated by energization of coils.

Therefore, electrical rotating machine 100 can rotate outer rotor 20 and inner rotor 30 independently by only supplying power from battery 220 to armature pole coils 14. This electrical rotating machine 100 works with short power path including rotating input shaft 101 and rotating output shaft 102. Since this stator 10, outer rotor 20 and inner rotor 30 do not use any highly precious permanent magnet made of neodymium magnet, and no power is supplied from the outside such as by providing a slip ring on inner rotor 30, an inexpensive and simple, in structure, self-excitation double-rotor electrical rotating machine 100 is realized. In addition, output characteristic is adjustable so that driving wheel 200 may be rotated with a required torque in response to driving condition.

As a first of other aspect of the present embodiments, in place of a diode 35 connected to each of wound coils 34, although illustration is omitted, wound coils 34 wound in the same direction may be connected in series at every other one pole in a peripheral direction to form two arrays of induced coils and two diodes 35 may be connected, one in one direction of rectification and the other in the opposite direction of rectification, between terminal ends of the two arrays of induced coils. In this case, too, as with the present embodiment, rotor teeth 32 of inner rotor 30 may work as permanent magnets which are situated along the periphery of inner rotor with the adjacent two reversed in direction of magnetization, thus forming a magnetic path allowing magnetic flux to pass smoothly bypassing slot 33. Moreover, induced current is generated and rectified at each of a plurality of wound coils 34 connected in series, admitting larger capacity of induced current into a circuit than that by a circuit foamed by a single induction coil, rotating inner rotor 30 or rotating output shaft 102 with a large torque by generating a larger electromagnetic force.

Figure 13:
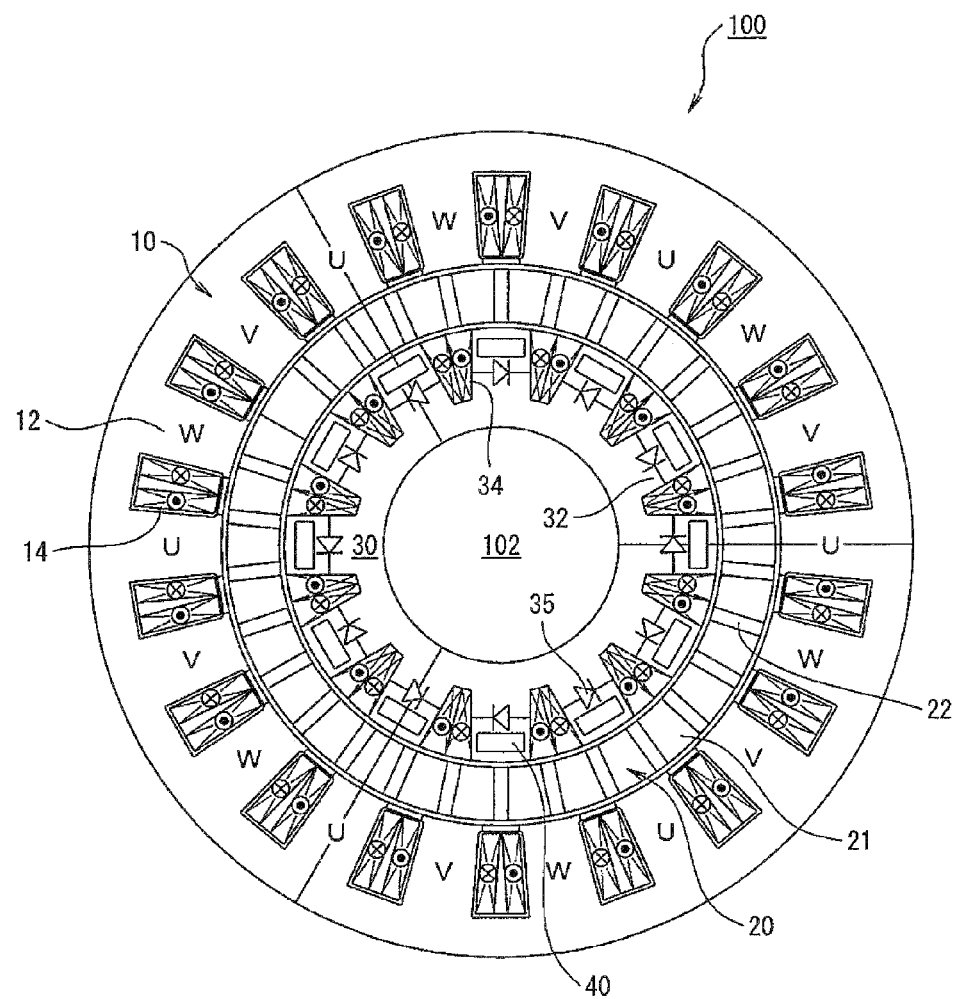
FIG. 13 is a schematic diagram, i.e. a view showing a second embodiment of an electrical rotating machine, in which its inner rotor has permanent magnets in addition to diodes.

Moreover, as a second aspect of the present embodiment, as shown in FIG. 13, permanent magnets 40 may be embedded in rotor teeth 32, respectively. Each of the permanent magnets 40 is arranged in a way that the direction of magnetization of magnetic poles (N pole, S pole) becomes the same as the direction of magnetization when the adjacent one of rotor teeth 32 work to act as a permanent magnet by rectification by diode 35. In this case, magnetic force of permanent magnet 40 is added to magnetic force of electromagnet of rotor tooth 32 to rotate inner rotor 30 or rotating output shaft 102 with a larger torque by producing a larger magnetic force. Since magnetic force required as an assist to electromagnetic force created by wound coil 34 is not strong and thus there is no need for such a rare and precious permanent magnet as a Neodymium magnet, the permanent magnet 40 may be selected from inexpensive permanent magnets whose stable supply is ensured. But, a rare and precious Neodymium magnet may be used to provide stable large torque.

Although the illustration is omitted, as a third aspect of the present embodiment, a radial gap construction forming diametrically spaced air gaps G1, G2 used in electrical rotating machine 100 is only one example. The present is not limited to his example. An axial gap construction forming air gap(s) in a direction along the axis of rotation may be used to constitute the invention. In this case, too, armature pole coils, relay portions and induction coils are arranged on a stator and two rotors.

Whilst the above described rotor 10 and stator 20 are made of laminated structures by laminating electromagnetic steel sheets, it is possible, for example, to use so-called soft magnetic composite cores (or SMC cores) which may be described as powder magnetic cores resulting from iron powder compression molding and heat treating soft magnetic composites (SMCs) of ferromagnetic powder particles, such as, iron powder particles, surrounded by an electrical insulating film. The SMC core is suitable for the axial gap construction because of its ease of molding.

Use of electrical rotating machine 100 is not limited to automotive use, and it is possible, for example, to suitably use it in wind-power generation or use it as a drive power in machine tools.

Although embodiments of the present invention have been described, it will be apparent to person skilled in the art that modifications may be made without departing from the scope of the present invention. All such modifications and equivalents thereof are intended to be covered by the following claims described in scope of claims.

DESCRIPTION OF SIGNS

10 Stator, 12 Stator teeth, 13,33 Slot, 14 Armature pole coil, 14*bu*, 14*bn*, 14*bw* Input terminal, 20 Outer rotor (Second rotor), 21 Relay portion, 22 Restriction portion, 30 Inner rotor (First rotor), 32 Rotor teeth (Salient poles), 34 Wound coil (Induction coil), 35 Diode, 40 Permanent magnet, 51-53 Wound coil, 61, 62 Connection switch, 65-67 Bypass switch, 70 Connection ring, 100 Electrical rotating machine, 101 Rotating input shaft, 102 Rotating output shaft, 200 Engine, 210 Inverter, 220 Battery, 290 Driving wheel, FL Flux line, G1,G2 Air gap

The invention claimed is:

1. An electrical rotating machine comprising:
a stator including armature pole coils capable of generating magnetic flux when energized;
a first rotor driven to rotate when the magnetic flux passes therethough; and
a second rotor driven to rotate in a magnetic path of the magnetic flux that passes through the first rotor, wherein
the second rotor includes portions of different materials, in permeability, which are situated along the periphery of the second rotor,
the first rotor includes a plurality of salient poles situated along the periphery of the first rotor and wound by induction coils which induce induced current when linked by the magnetic flux generated by the armature pole coils,
the stator includes a plurality of wound coils winding around each of poles to constitute the armature pole coil for each of the plurality of salient poles, the plurality of wound coils to be energized being changeable, and
the first rotor includes diodes which are connected to the induction coils to rectify the induced current, and the first rotor further includes a permanent magnet which is arranged in a way that the direction of magnetization by the permanent magnet is the same as the direction of magnetization formed by the induced current owing to rectification by the diode.

2. The electrical rotating machine as recited in claim 1, wherein each of the armature pole coils is constituted by connecting the plurality of wound coils in series.

3. The electrical rotating machine as recited in claim 1, wherein the plurality of wound coils are formed by concentrated winding or distributed winding.

* * * * *